United States Patent
Pezeshki et al.

(10) Patent No.: US 11,606,243 B2
(45) Date of Patent: Mar. 14, 2023

(54) BEAM FAILURE DETECTION IN A SECOND BAND BASED ON MEASUREMENTS IN A FIRST BAND

(71) Applicant: QUALCOMM Incorporated, San Diego, CA (US)

(72) Inventors: Hamed Pezeshki, San Diego, CA (US); Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 17/158,656

(22) Filed: Jan. 26, 2021

(65) Prior Publication Data

US 2021/0243073 A1 Aug. 5, 2021

Related U.S. Application Data

(60) Provisional application No. 62/968,668, filed on Jan. 31, 2020.

(51) Int. Cl.
 *H04L 41/0668* (2022.01)
 *H04L 43/08* (2022.01)
 (Continued)

(52) U.S. Cl.
 CPC ......... *H04L 41/0668* (2013.01); *G06N 20/00* (2019.01); *H04B 17/318* (2015.01);
 (Continued)

(58) Field of Classification Search
 None
 See application file for complete search history.

(56) References Cited

U.S. PATENT DOCUMENTS

2018/0131426 A1 5/2018 Lee et al.
2019/0081687 A1 3/2019 Sadiq et al.
 (Continued)

FOREIGN PATENT DOCUMENTS

WO 2019177272 A1 9/2019

OTHER PUBLICATIONS

Alrabeiah M., et al., "Deep Learning for mmWave Beam and Blockage Prediction Using Sub-6GHz Channels", arxiv.org, Cornell University Library, 201OLIN Library Cornell University Ithaca, NY, 14853, Oct. 7, 2019 (Oct. 7, 2019), 31 Pages, 20191017, XP081511720, Abstract.
 (Continued)

*Primary Examiner* — Rebecca E Song
(74) *Attorney, Agent, or Firm* — Patterson + Sheridan, L.L.P.

(57) ABSTRACT

Certain aspects of the present disclosure provide techniques for beam failure detection in a second band based on measurements in a first band. A method that may be performed by a user equipment (UE) includes receiving one or more reference signals (RSs) on a first radio frequency band and initiating a beam failure recovery on a second radio frequency band based, at least in part, on the one or more RSs on the first radio frequency band. The UE may measure the one or more RSs on the first radio frequency band and perform beam failure detection (BFD) for the second radio frequency band based, at least in part, on one or more measurements of the one or more RSs on the first radio frequency band.

26 Claims, 15 Drawing Sheets

(51) Int. Cl.
*G06N 20/00* (2019.01)
*H04B 17/318* (2015.01)
*H04L 41/16* (2022.01)
*H04L 5/00* (2006.01)

(52) U.S. Cl.
CPC ............ *H04L 5/0048* (2013.01); *H04L 41/16* (2013.01); *H04L 43/08* (2013.01)

(56) References Cited

U.S. PATENT DOCUMENTS

2019/0357291 A1\* 11/2019 Zhou ..................... H04L 5/0053
2021/0006456 A1    1/2021 Kim et al.
2021/0315041 A1\* 10/2021 Matsumura ....... H04W 72/0413
2022/0294520 A1\* 9/2022 Tran ....................... H04B 7/088
2022/0322325 A1\* 10/2022 Svedman ............ H04W 72/046

OTHER PUBLICATIONS

International Search Report and Written Opinion—PCT/US2021/015283—ISA/EPO—dated Mar. 26, 2021.

\* cited by examiner

BEAM FAILURE DETECTION IN A SECOND BAND BASED ON MEASUREMENTS IN A FIRST BAND

CROSS-REFERENCE TO RELATED APPLICATION

This application claims benefit of and priority to U.S. Provisional Patent Application No. 62/968,668, filed Jan. 31, 2020, which is hereby incorporated by reference in its entirety.

INTRODUCTION

Aspects of the present disclosure relate to wireless communications, and more particularly, to techniques for beam failure detection.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved beam failure detection (BFD).

Certain aspects of the subject matter described in this disclosure can be implemented in a method for wireless communication by a user equipment (UE). The method generally includes receiving one or more reference signals (RSs) on a first radio frequency band and initiating a beam failure recovery procedure on a second radio frequency band based, at least in part, on the one or more RSs received on the first radio frequency band.

Certain aspects of the subject matter described in this disclosure can be implemented in an apparatus for wireless communication by a UE. The apparatus generally includes means for receiving one or more RSs on a first radio frequency band and means for initiating a beam failure recovery procedure on a second radio frequency band based, at least in part, on the one or more RSs received on the first radio frequency band.

Certain aspects of the subject matter described in this disclosure can be implemented in an apparatus for wireless communication. The apparatus generally includes a memory and at least one processor coupled with the memory. The memory and at least one processor are generally configured to receive one or more RSs on a first radio frequency band and initiate a beam failure recovery procedure on a second radio frequency band based, at least in part, on the one or more RSs received on the first radio frequency band.

Certain aspects of the subject matter described in this disclosure can be implemented in a computer readable medium storing computer executable code thereon for wireless communication. The computer readable medium generally includes code for receiving one or more RSs on a first radio frequency band and code for initiating a beam failure recovery procedure on a second radio frequency band based, at least in part, on the one or more RSs received on the first radio frequency band.

Certain aspects of the subject matter described in this disclosure can be implemented in a method for wireless communication by a UE. The method generally includes measuring one or more RSs on a first radio frequency band. The method generally includes determining BFD for a second radio frequency band based, at least in part, on the measurements of the one or more RSs on the first radio frequency band.

Certain aspects of the subject matter described in this disclosure can be implemented in a method for wireless communication by a base station (BS). The method generally includes sending a first one or more RSs to a UE on a first radio frequency band. The method generally includes receiving a request from the UE, in response to the first one or more RSs on the first radio frequency band, to send a second one or more RSs on a second radio frequency band. The method generally includes sending the second one or more RSs to the UE on the second radio frequency band.

Certain aspects of the subject matter described in this disclosure can be implemented in an apparatus for wireless communication. The apparatus generally includes a memory and at least one processor coupled with the memory. The memory and at least one processor are generally configured to measure one or more RSs on a first radio frequency band and determine BFD for a second radio frequency band based, at least in part, on the measurements of the one or more RSs on the first radio frequency band.

Certain aspects of the subject matter described in this disclosure can be implemented in an apparatus for wireless communication. The apparatus generally includes a memory and at least one processor coupled with the memory. The memory and at least one processor are generally configured to send a first one or more RSs to a UE on a first radio frequency band; receive a request from the UE, in response to the first one or more RSs on the first radio frequency band, to send a second one or more RSs on a second radio frequency band; and to send the second one or more RSs to the UE on the second radio frequency band.

Certain aspects of the subject matter described in this disclosure can be implemented in an apparatus for wireless communication. The apparatus generally includes means for measuring one or more RSs on a first radio frequency band and means for determining BFD for a second radio frequency band based, at least in part, on the measurements of the one or more RSs on the first radio frequency band.

Certain aspects of the subject matter described in this disclosure can be implemented in an apparatus for wireless communication. The apparatus generally includes means for sending a first one or more RSs to a UE on a first radio frequency band; means for receiving a request from the UE, in response to the first one or more RSs on the first radio frequency band, to send a second one or more RSs on a second radio frequency band; and means for sending the second one or more RSs to the UE on the second radio frequency band.

Certain aspects of the subject matter described in this disclosure can be implemented in a computer readable medium storing computer executable code thereon for wireless communication. The computer readable medium generally includes code for measuring one or more RSs on a first radio frequency band and code for determining BFD for a second radio frequency band based, at least in part, on the measurements of the one or more RSs on the first radio frequency band.

Certain aspects of the subject matter described in this disclosure can be implemented in a computer readable medium storing computer executable code thereon for wireless communication. The computer readable medium generally includes code for sending a first one or more RSs to a UE on a first radio frequency band; code for receiving a request from the UE, in response to the first one or more RSs on the first radio frequency band, to send a second one or more RSs on a second radio frequency band; and code for sending the second one or more RSs to the UE on the second radio frequency band.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
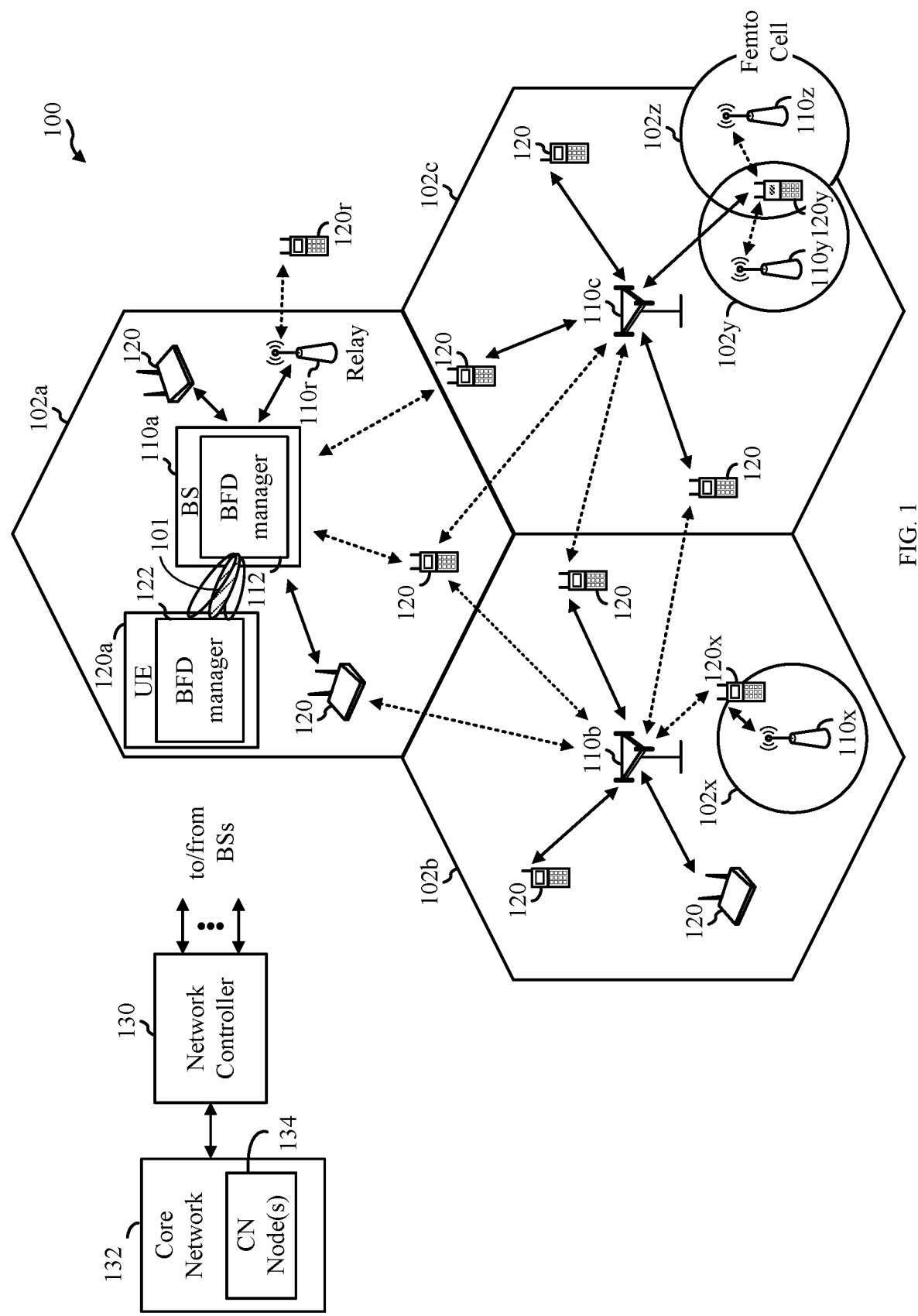
FIG. 1 is a block diagram conceptually illustrating an example telecommunications system, in accordance with certain aspects of the present disclosure.

Aspects of the present disclosure provide apparatus, methods, processing systems, and computer readable mediums for beam failure detection (BFD) for a second radio frequency band based on measurements in a first radio frequency band. As used herein, a radio frequency band may also be referred to as a frequency band or a band.

In certain systems, machine learning (ML) techniques can be used to predict channel characteristics in a second radio frequency band based on measurements in a first radio frequency band. For example, measurements in a first radio frequency band (e.g., the sub-6 GHz band, also sometimes referred to as FR1) may be simpler and be more power efficient than performing the measurements in a different band (e.g., the millimeter wave (mmW) band, also sometimes referred to as FR2, which may be in a frequency range from 24.25-52.6 GHz). In one example, measurements in the first band may be more efficient than measurements in the second band. For example, the measurements in the first band may be more efficient than the measurements in the second band due to hardware characteristics of the UE. Also, the measurement overhead in the second band may be low by using the measurements from the first band.

In some examples, BFD in the FR2 band can be detected/reported based on reference signal (RS) measurements in the FR1 band (or other bands, such as measurements on FR2 to estimate the channel and perform BFD for FR4). In some examples, the UE can detect beam failure for the second band based on the estimates from the RS measurements in the first band (e.g., without performing any RS measurements in the second band). For example, the UE can estimate (e.g., predict) reference signal receive power (RSRP) for a serving beam in the second band based on RS measurements in the first band. If the estimated RSRP for the second band at or above a BFD threshold for the second band, or outside a margin of the BFD threshold for the second band, the UE can determine that there is no beam failure for the second band without further RS measurement in the second band. If the RSRP estimate for the serving beam in the second band is within the margin (e.g., approaching the BFD threshold for the second band), or within the margin for a threshold number of measurement instances, the UE may request the base station to send BFD RSs (e.g., "on-demand BFD RS") on the second band. The UE can then measure and determine the BFD RSs on the second band to determine whether the second band is in beam failure. In some examples, the request for RSs is sent on a physical uplink control channel (PUCCH). If the RSRP is outside the margin below the BFD threshold for the second band, the UE can determine that the serving beam in second band is not in or approaching beam failure.

The following description provides examples of BFD in a second band based on measurements in a first band in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

New radio (e.g., 5G NR) access may support various wireless communication services, such as enhanced mobile broadband (eMBB) targeting wide bandwidth, millimeter wave (mmW) targeting high carrier frequency, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110), user equipments (UEs) 120a-y (each also individually referred to herein as UE 120 or collectively as UEs 120), and other network entities in the wireless communication network 100 via one or more interfaces. The core network 132 may include one or more core network nodes 134.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices. The BSs 110 and UEs 120 may communicate with each other using beams. As shown in FIG. 1, the BS 110a may communicate with the UE 120a using a serving beam 101 (e.g., from a set of beams).

A network controller 130 may be in communication with a set of BSs 110 and provide coordination and control for these BSs 110 (e.g., via a backhaul). In aspects, the network controller 130 may be in communication with the core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

According to certain aspects, the BSs 110 and UEs 120 may be configured for BFD. As shown in FIG. 1, the BS 110a includes a BFD manager 112. As shown in FIG. 1, the UE 120a includes a BFD manager 122. The BFD manager 112 and/or the BFD manager 122 may be configured for BFD in a second band based on measurements in a first band, in accordance with aspects of the present disclosure.

Figure 2:
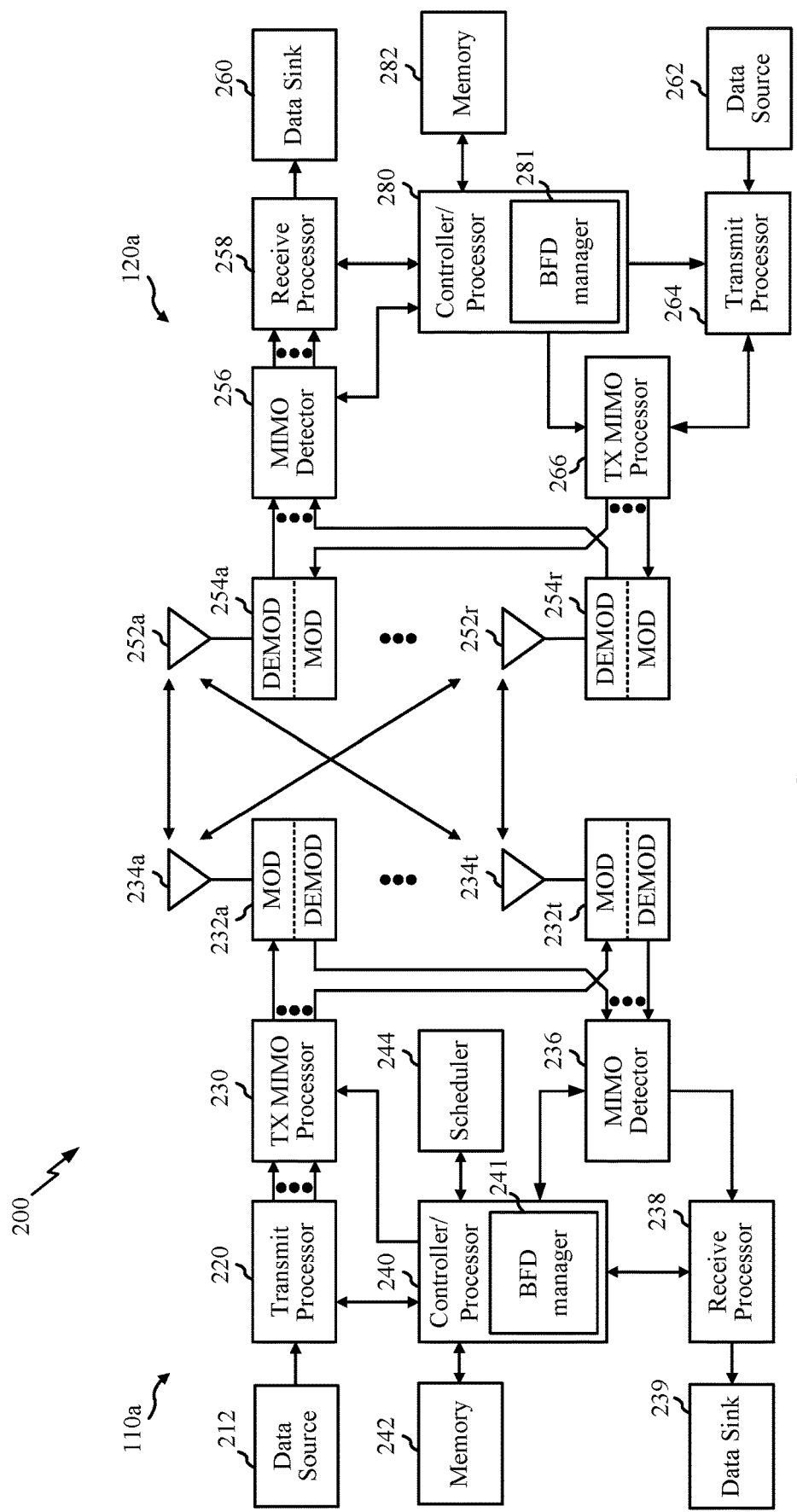
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a BFD manager 241 and the controller/processor 280 of the UE 120*a* has BFD manager 281. The BFD manager 241 and/or the BFD manager 281 may be configured for BFD for a second band based on measurements in a first band, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
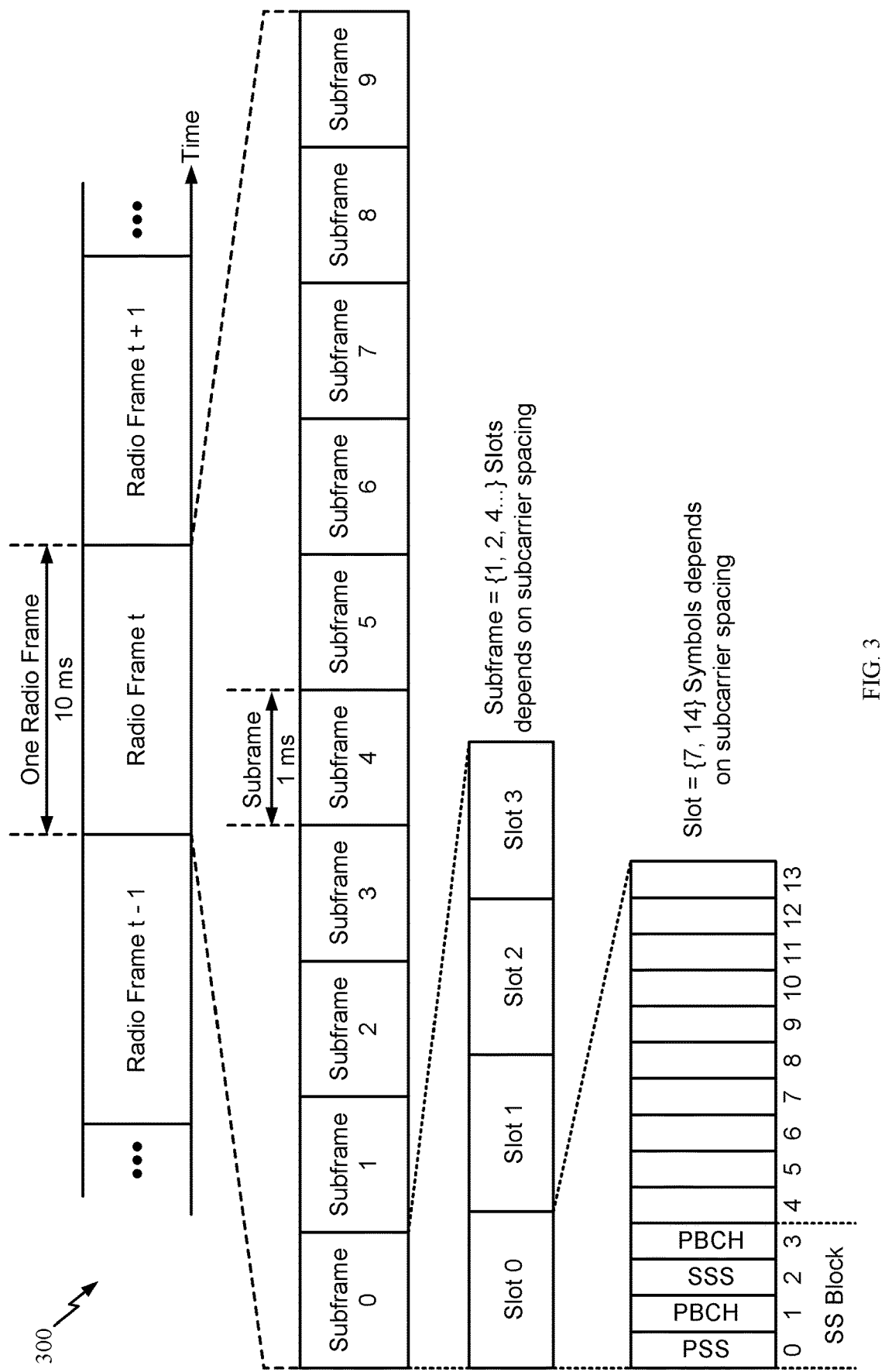
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A sub-slot structure refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In certain systems, a UE may be configured for beam failure detection (BFD). For example, the UE may detect beam failure when a channel estimate fails to meet BFD threshold. The UE may be configured by radio resource control (RRC) signaling with a beam failure recovery procedure. The beam failure recovery procedure may include sending a beam recovery request message to the serving BS (e.g., a gNB). For example, the UE may send a random access channel (RACH) message to the serving BS indicating a new beam, such as by indicating a new synchronization signal block (SSB) or CSI-RS when beam failure is detected on the serving beam (e.g., the serving SSB(s)/CSI-RS(s)). The UE may detect beam failure by counting beam failure instance indication(s) from the lower layers to the UE. If beam failure recovery is reconfigured by upper layers during an ongoing random access procedure for beam failure recovery, the UE stops the ongoing random access procedure and initiates a new random access procedure using the new configuration.

The RRC configured beam failure detection and beam failure recovery parameters may include: beamFailureInstanceMaxCount for the beam failure detection; beamFailureDetectionTimer for the beam failure detection; beamFailureRecovery Timer for the beam failure recovery procedure; rsrp-ThresholdSSB: an RSRP threshold for the beam failure recovery; powerRampingStep: powerRampingStep for the beam failure recovery; powerRampingStepHighPriority: powerRampingStepHighPriority for the beam failure recovery; preambleReceivedTargetPower: preambleReceivedTarget Power for the beam failure recovery; preambleTransMax: preambleTransMax for the beam failure recovery; scalingFactorBI: scalingFactorBI for the beam failure recovery; ssb-perRACH-Occasion: ssb-perRACH-Occasion for the beam failure recovery; ra-ResponseWindow: the time window to monitor response(s) for the beam failure recovery using contention-free Random Access Preamble; prach-ConfigurationIndex: prach-ConfigurationIndex for the beam failure recovery; ra-ssb-OccasionMaskIndex: ra-ssb-OccasionMaskIndex for the beam failure recovery; and/or ra-OccasionList: ra-Occasion List for the beam failure recovery. The UE may also be configured with a parameter BFI_COUNTER: a counter for beam failure instance indication which is initially set to 0.

In some examples, a UE and a BS operate in a same environment; however, the UE may operate in different frequencies having different channel properties. There may be some cross-frequency correlation between channel characteristics in different bands. Machine learning (ML) techniques can be utilized to predict channel characteristics in a second frequency band based on measurements in a first frequency band.

Figure 4:
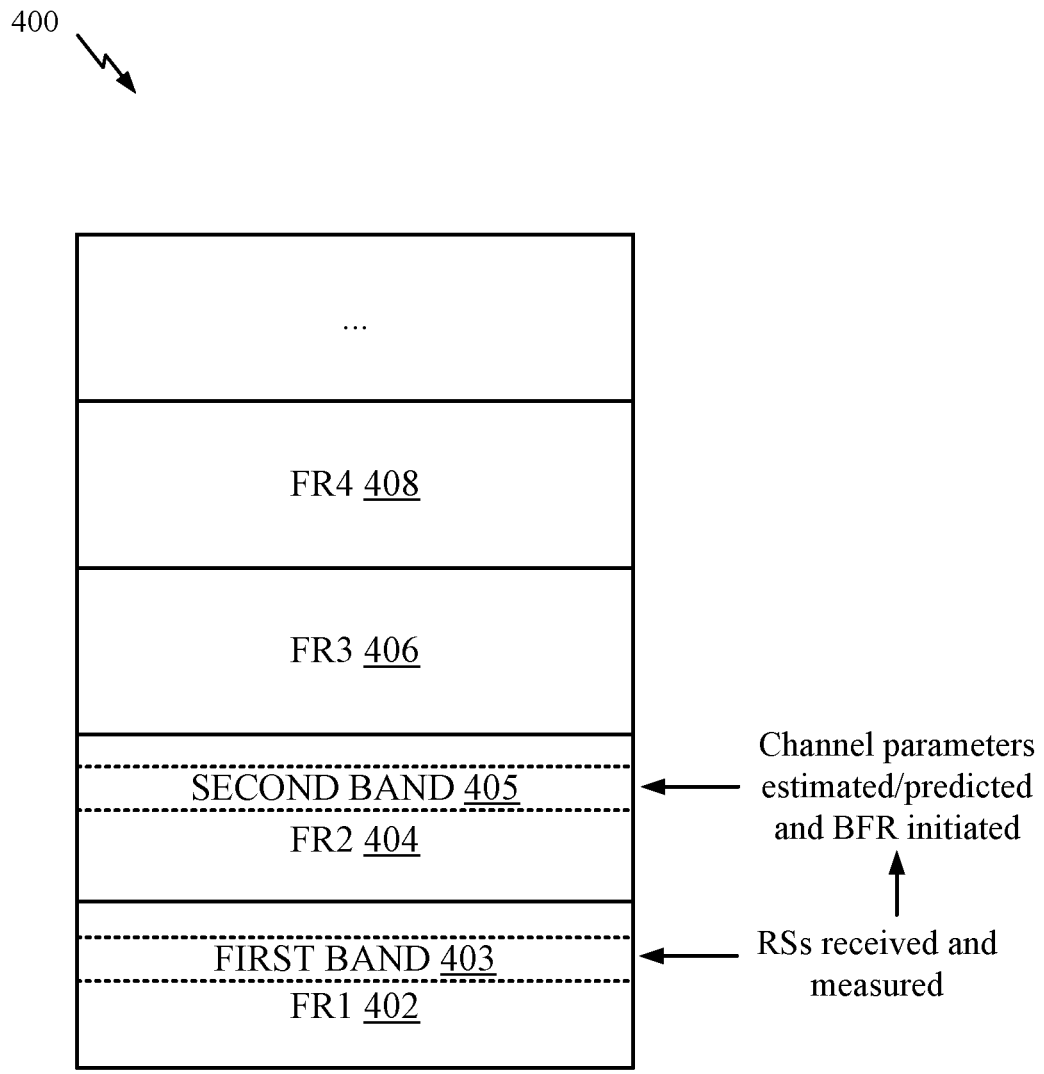
FIG. 4 is a diagram illustrating example frequency ranges, in accordance with certain aspects of the present disclosure.

In some examples, the ML techniques involve training a model, such as a predictive model. The model may be used to predict (e.g., estimate) the channel characteristics in the second band based on the measurements in the first band. The model may be trained based on training data (e.g., training information), which may include feedback, such as feedback associated with the measurements in the first band compared to measurements in the second band. For example, as shown in FIG. 4, measurements on a first band 403 in FR1 402 may be used to predict the channel characteristics in a second band 405 in FR2 404. Alternatively, measurements in any FR1 402, FR2 404, FR3 406, or FR4 408 (or another frequency range) may be used to predict the channel characteristics in another one of the frequency ranges.

Figure 5:
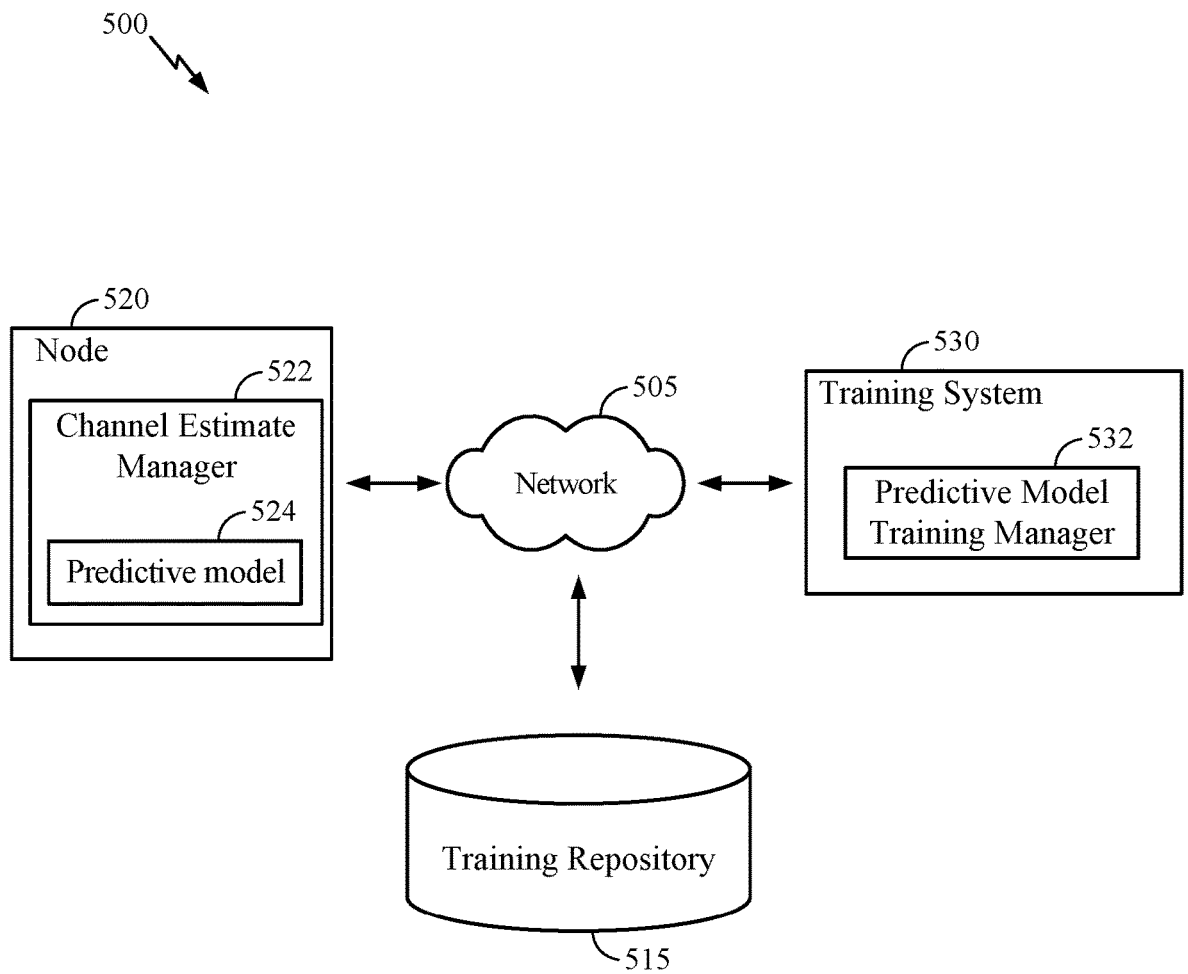
FIG. 5 illustrates an example networked environment in which a predictive model is used for channel estimates, according with certain aspects of the present disclosure.

FIG. 5 illustrates an example networked environment 500 in which a predictive model 524 is used for channel estimation, according to certain aspects of the present disclosure. As shown in FIG. 5, networked environment 500 includes a node 520, a training system 530, and a training repository 515, communicatively connected via network 505. The node 520 may be a UE (e.g., such as the UE 120*a* in the wireless communication network 100). The network 505 may be a wireless network such as the wireless communication network 100, which may be a 5G NR network. While the training system 530, node 520, and training repository 515 are illustrated as separate components in FIG. 5, it should be recognized by one of ordinary skill in the art that training system 530, node 520, and training repository 515 may be implemented on any number of computing systems, either as one or more standalone systems or in a distributed environment.

The training system 530 generally includes a predictive model training manager 532 that uses training data to generate the predictive model 524 for channel estimation on the second band based on measurements in the first band. The predictive model 524 may be determined based on the information in the training repository 515.

The training repository 515 may include training data obtained before and/or after deployment of the node 520. The node 520 may be trained in a simulated communication environment (e.g., in field testing, drive testing) prior to deployment of the node 520. For example, various channel estimations can be tested to obtain training information related to the measurements and/or estimates. This information can be stored in the training repository 515. After deployment, the training repository 515 can be updated to include feedback associated with channel estimations performed by the node 520. The training repository can also be updated with information from other BSs and/or other UEs, for example, based on learned experience by those BSs and UEs, which may be associated with procedures performed by those BSs and/or UEs.

The predictive model training manager 532 may use the information in the training repository 515 to determine the predictive model 524 (e.g., algorithm) used for estimating channel characteristics in the second band based on measurements in the first band. The predictive model training manager 532 may use various different types of machine learning algorithms to form the predictive model 524. The training system 530 may be located on the node 520, on a BS in the network 505, or on a different entity that determines the predictive model 524. If located on a different entity, then the predictive model 524 is provided to the node 520. The training repository 515 may be a storage device, such as a memory. The training repository 515 may be located on the node 520, the training system 530, or another entity in the network 505. The training repository 515 may be in cloud storage. The training repository 515 may receive training information from the node 520, entities in the network 505 (e.g., BSs or UEs in the network 505), the cloud, or other sources.

The machine learning may use any appropriate machine learning algorithm. In some non-limiting examples, the machine learning algorithm is a supervised learning algorithm, a deep learning algorithm, an artificial neural network algorithm, or other type of machine learning algorithm.

In some examples, the machine learning (e.g., used by the training system 430) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the machine learning (e.g., used by the training system 430) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots. Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by the training system 530), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, when using a machine learning algorithm, the training system 530 generates vectors from the information in the training repository 515. In some examples, the training repository 515 stores vectors. In some examples, the vectors map one or more features to a label. For example, the features may correspond to measurements on the first band. The label may correspond to the predicted channel characteristics of the second band (e.g., as will be discussed in more detail below, according to certain aspects, the label may be estimated RSRP of the serving beam in the second band). The predictive model training manager 532 may use the vectors to train the predictive model 524 for the node 520. As discussed above, the vectors may be associated with weights in the machine learning algorithm.

Using machine learning to estimate channel characteristics on a second band based on measurements in a first band may provide advantages. For example, measurements in a first band (e.g., the sub-6 GHz band, also referred to as FR1) may be simpler and be more power efficient) than performing the measurements in a different band (e.g., the mmWave band, also referred to as FR2). This may be due to hardware characteristics of the UE. Also, the measurements in the second band may be reduced or eliminated by using the measurements from the first band, thus, reducing measuring overhead in the second band.

Example BFD in a Second Band Based on Measurements in a First Band

According to certain aspects, beam failure detection (BFD) in a second band can be based on measurements in a first band. For example, a user equipment (UE) may estimate channel characteristics of the second based on the measurements in the first band. For example, the UE may estimate a reference signal receive power (RSRP) of a serving beam in the second band based on reference signal (RS) measurements in the first band. In some examples, the UE uses a machine learning (ML) algorithm to predict the channel characteristics of the second band based on the measurements in the first band. In some examples, the UE can detect beam failure in the second band based on RS measurements in the first band.

In some examples, the UE may detect beam failure in the second band without performing any RS measurements in the second band. For example, if the RSRP estimate(s) for the serving beam in the second band, determined based on the RS measurements in the first band, are at or above a BFD threshold for the second band, then the UE can determine that there is not beam failure for the second band. However, if the channel estimate for the second band is below the BFD threshold for the second band, the UE can determine a beam failure event for the second band (e.g., when the RSRP estimate for the second band is below the BFD threshold for a threshold number of measurement instances for the second band).

In some examples, the UE may detect beam failure in the second band further performing RS measurements in the second band when the estimated RSRP for the second band is within a margin of the BFD threshold for the second band (e.g., close to the BFD threshold for the second band). In this case, when the estimated RSRP for the second band is above the BFD threshold, but within a margin of the BFD threshold, then the UE may request BFD RSs (e.g., "on-demand BFD RS") for the second band to then measure and determine beam failure detection event in the second band. The UE may send the request for the BFD RSs on the PUCCH. If the RSRP measured on the second band is above the BFD threshold for the second band, then UE may determine that the serving beam the second is not in beam failure. If the measured RSRP on the second band is below the BFD threshold for the second band, the UE can determine a beam failure event for the second band (e.g., when the measured RSRP for the second band is below the BFD threshold for a threshold number of measurement instances for the second band).

According to certain aspects, the UE may perform beam failure detection in a higher band (e.g., FR2) based on RS measurements in a lower band (e.g., FR1). The band may be any bands and may be in any frequency range (e.g., FR1, FR2, FR4, etc.).

Figure 6:
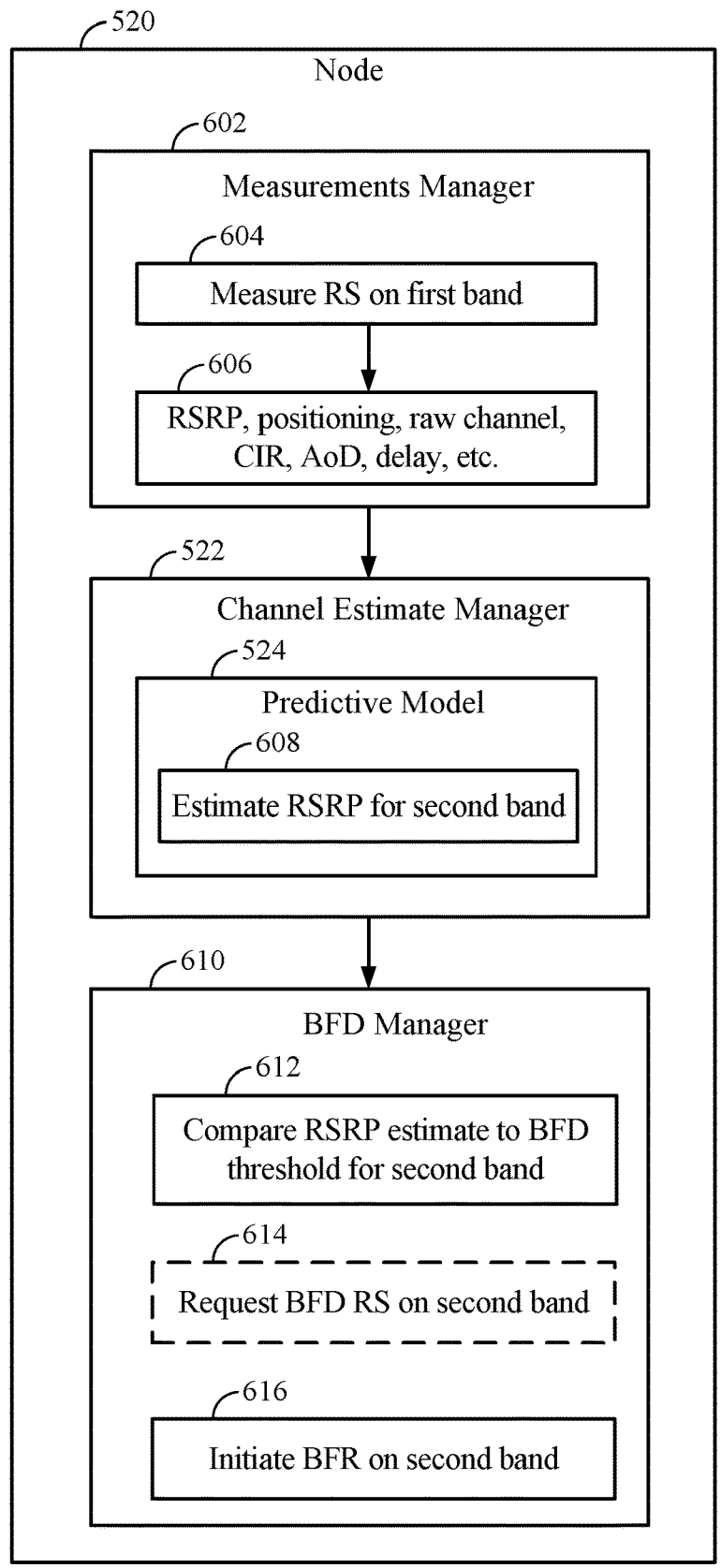
FIG. 6 illustrates an example node in a networked environment in which a predictive model is used for channel estimates for beam failure detection, according with certain aspects of the present disclosure.

As shown in FIG. 6, a node, such as the node 520 in the environment 500 illustrated in FIG. 5, may include a measurements manager 602. The measurements manager 602 may be configured to measure one or more RSs on the first band at 604.

The measurements from the measurement manager 602 can be provided to the predictive model 524 at the channel estimate manager 522. The channel estimate manager 522 may input the measurements to a machine learning algorithm. The inputs may include any measurements in the first band. The inputs to the machine learning algorithm may include RS measurements in the first band. As shown in FIG. 6, in some examples, the measurements manager 602 measures RSs on the first band at 604, to provide measurement results 606 that may include reference signal receive power (RSRP) measurements in the first band, positioning information of the UE (e.g., which may be used to learn the beam direction), raw channel measurements, channel impulse response (CIR) measurements, angle of departure (AoD) measurements (e.g., AoD of the strongest multi-path component (MPC)), delay profile of the strongest MPC, and/or other measurements in the first band and/or other input that may be used by the machine learning algorithm to estimate channel characteristics of the second band and/or predict RSRP for a beam, (e.g., the serving beam) at the second band.

In some examples, the output of the machine learning algorithm is predicted RSRP values for beams in the second band. As shown in FIG. 6, the predictive model 524 may be configured to estimate RSRP for the second band and provide the estimates to the BFD manager 610. In some examples, the predictive model may be located at the BS. For example, a UE can report the measurements on the first band to the BS and the BS can use the measurements to estimate the channel characteristics of the second band. The BS may then provide the estimates to the UE, and/or the BS may use the estimates to detect beam failure for the serving beam in the second band.

In some examples, the machine learning algorithm is trained with historical training data including measurements in the first band (including one or more previous measurements of the inputs discussed above), previous measurements of channel characteristics of the second band, and/or previous measurements in the second band compared to the measurements/estimates from the first band in order to train the machine learning algorithms. In some examples, the machine learning algorithm is further based on the information related to the environment. In some examples, the machine learning can be trained for various different environments, and the predictive model used may be based on the current environment.

According to certain aspects, the BFD manager 610 uses the channel characteristics (e.g., RSRP for the serving beam) for the second band, estimated from the RS measurements on the first band using the machine learning algorithm, to determine a beam on the second band that is in failure or close to failure. For example, the BFD manager 610 may be configured to compare the RSRP estimates for the second band to a BFD threshold for the second band, at 612. The BFD manager 610 may also track a number of measurement instances that the RSRP estimates for the second band are below an RSRP threshold for the second band. The BFD manager 610 may compare the number of measurement instances that the RSRP estimates for the second band are below the RSRP threshold for the second band to a threshold number of instances for the second band. The BFD manager 610 may determine beam failure for the second band when the RSRP estimates for the second band are below the RSRP threshold for the second band for at or above the threshold number of instances for the second band.

In some examples, if the BFD manager 610 determines that the beam is in failure (when the estimated RSRP value for the second band is below the BFD threshold for the second band for at or above the threshold number of measurement instances), the BFD manager 610 may initiate beam failure recovery (BFR) at 616, for example, by sending a BFR message to the BS. In this case, the node 620 may not perform any BFD RS measurements on the second band. The BFR message may be a random access channel (RACH) message indicating a new beam for the second band. In some examples, if the estimated RSRP is above the BFD threshold for the second band, then the BFD manager 628 may determine that the beam is not in failure.

In some examples, the BFD manager 610 may request the network (e.g., the BS) to send RSs on the second band based on the measurements on the first band. This may be referred to as an "on-demand" BFD RS. The BFD manager 610 may send the request on a PUCCH. For example, the BFD manager 610 may send the request for the BFD RSs on the second band, at 614, when the estimated RSRP is close to or approaching the BFD threshold (e.g., above the BFD threshold and within a margin range of the BFD threshold) for the second band. Then, the node 620 can measure the RSs on the second band to determine the actual RSRP values for the second band and determine whether the beam for the second band is in failure based on the actual RSRP measured on the RSs on the second band. The BFD manager 610 can initiate BFR, at 616, when it determines that the beam is in failure based on the actual RSRP. In some examples, if the actual RSRP is at or above the BFD threshold for the second band, then the BFD manager 628 may determine that the beam is not in failure and does not initiate BFR. In some examples, if the estimated RSRP is not close to the BFD threshold for the second band (e.g., above the margin of the BFD threshold), then the BFD manager 628 may determine that the beam is not close to failure and may not request the RSs on the second band and does not initiate BFR.

Thus, the node 620 can measure on the first band, which may be more power-efficient than measuring on the second band. Further, the signaling overhead related to reference signals in the second band can be low, by replacing reference signals with data, since node 620 can rely on measuring "on-demand" reference signals on the second band, thereby having an efficient signaling overhead and conserving power.

Figure 7:
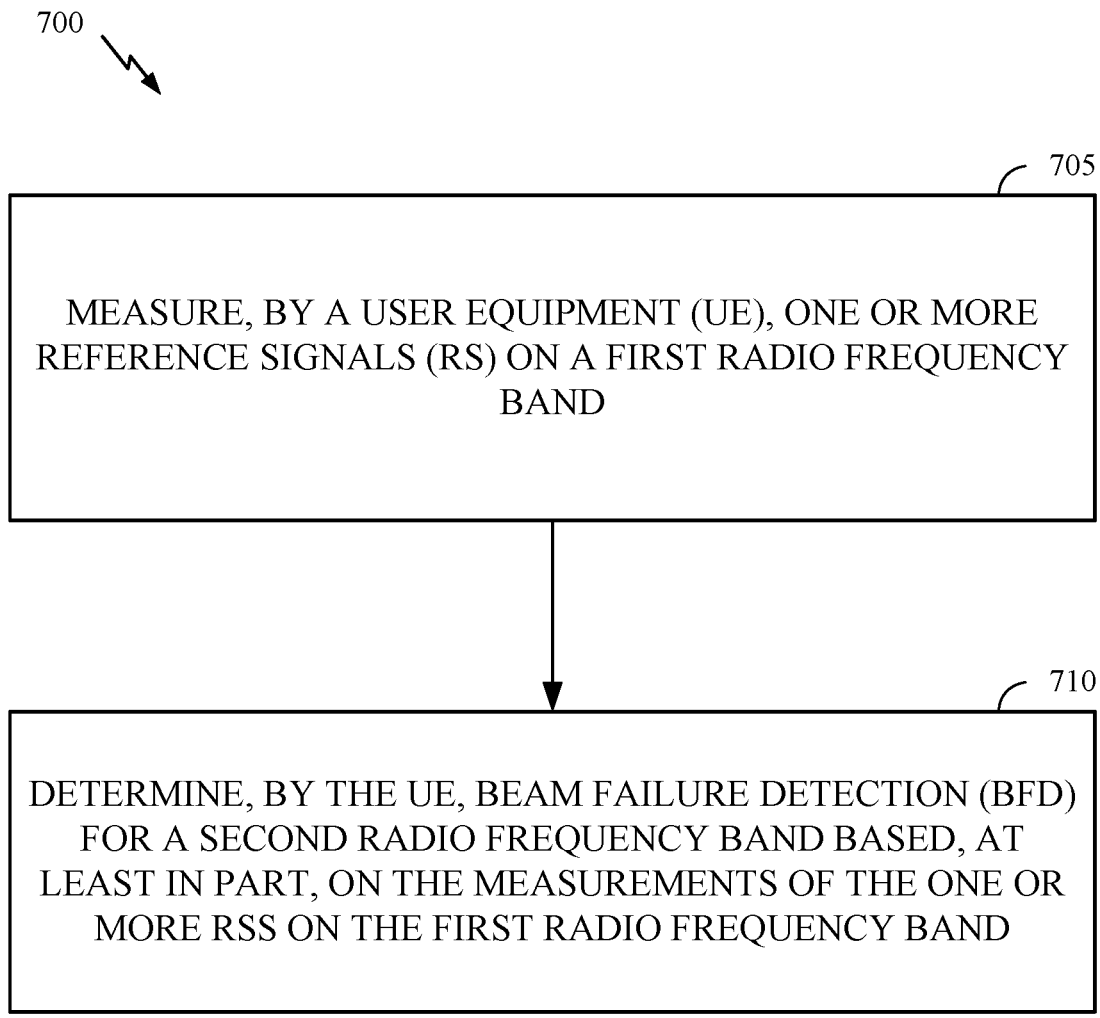
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120*a* in the wireless communication network 100). Operations 700 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 705, by measuring one or more RSs on a first radio frequency band. In some examples, the first radio frequency band is in a lower frequency range than the second radio frequency band. In some examples, the first radio frequency band is in a sub-6 GHz frequency range and the second radio frequency band is in a mmW frequency range. In some examples, the measurements on the first radio frequency band comprises one or more RSRP measurements, one or more positioning measurements, one or more raw channel measurements, one or more CIR measurements, one or more AoD measurements, one or more delay measurements, or a combination thereof.

At 710, the UE determines BFD for a second radio frequency band based, at least in part, on the measurements of the one or more RSs on the first radio frequency band. In some examples, determining BFD for the second radio frequency band includes estimating one or more channel parameters of the second radio band using a machine learning (ML) algorithm with the measurements of the one or more RSs on the first radio frequency band as input. In some examples, the estimated one or more channel parameters comprises estimated one or more RSRP values.

In some examples, determining BFD for the second radio frequency band includes reporting BFD (e.g., initiating beam failure recovery) when the estimated RSRP for the serving beam of the second radio band are below a beam failure threshold for the second radio frequency band for at or above a threshold number of measurement instances for the second band. In some examples, determining BFD for the second radio frequency band includes requesting one or more RSs on the second radio frequency band when the estimated RSRP for the serving beam of the second radio band are within a margin of a BFD threshold for the second radio frequency band; measuring the one or more RSs on the second radio frequency band; and reporting BFD (e.g., and/or initiating a beam failure recovery procedure) for the second radio frequency band based on the measurements of the one or more RSs on the second radio frequency band for at or above the threshold number of measurement instances for the second band.

Figure 8:
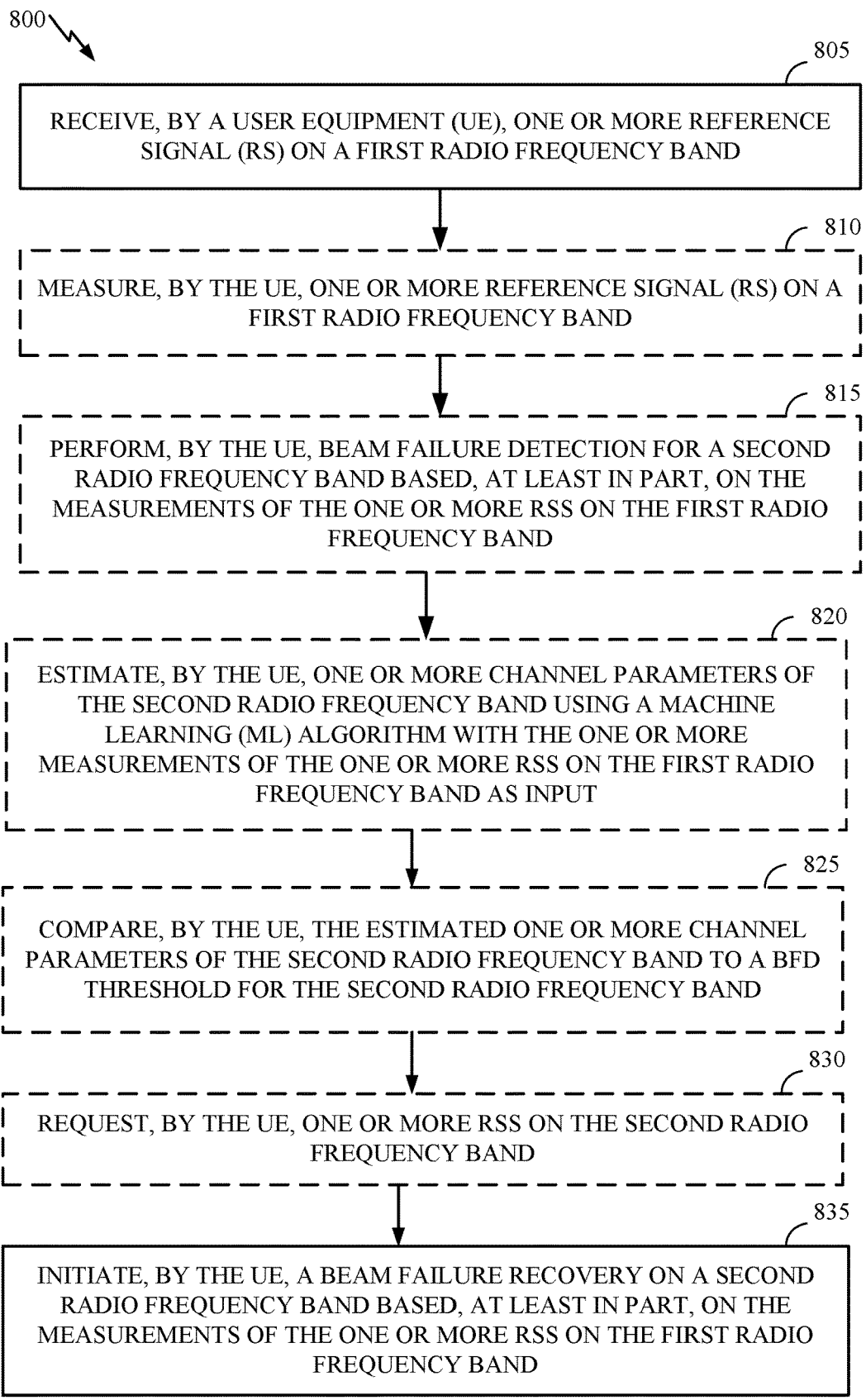
FIG. 8 is a flow diagram illustrating example operations for wireless communication by a UE, in accordance with certain aspects of the present disclosure.

FIG. 8 is a flow diagram illustrating example operations 800 for wireless communication, in accordance with certain aspects of the present disclosure. The operations 800 may be performed, for example, by UE (e.g., such as a UE 120a in the wireless communication network 100). Operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin, at 805, by receiving one or more RSs on a first radio frequency band.

At 810, the UE may measure the one or more RSs on the first radio frequency band. For example, the UE may make RSRP measurements, positioning measurements, raw channel measurements, CIR measurements, AoD measurements, and/or delay measurements.

At 815, the UE may perform BFD for the second radio frequency band based, at least in part, on one or more measurements of the one or more RSs on the first radio frequency band. The first radio frequency band may be in a lower frequency range (e.g., in a sub-6 GHz radio frequency range) than the second radio frequency band (e.g., in a mmW radio frequency range). At 820, the UE may estimate one or more channel parameters (e.g., RSRP) of the second radio frequency band using a ML algorithm with the one or more measurements of the one or more RSs on the first radio frequency band as input. At 825, the UE compares the estimated one or more channel parameters of the second radio frequency band to a BFD threshold for the second radio frequency band. For example, the UE may compare estimated one or more channel parameters of the second radio frequency band to an channel parameter threshold for the second radio frequency band. The UE may track the number of measurement instances that the estimated one or more channel parameters of the second radio frequency band is below the channel parameter threshold for the second radio frequency band. The UE may compare the number of measurement instances that the estimated one or more channel parameters for the second radio frequency band is below the channel parameter threshold for the second radio frequency band to a threshold number of measurement instances for the second radio frequency band.

The UE may detect beam failure for the second radio frequency band when the estimated one or more channel parameters of the second radio frequency band are below the channel parameter threshold for the second radio frequency band for at or above the threshold number of measurement instances for the second radio frequency. At 830, the UE may request one or more RSs on the second radio frequency band when the estimated one or more channel parameters of the second radio frequency band are within a predefined margin of the BFD threshold for the second radio frequency band. The UE may measure the one or more RSs (e.g., on-demand BFD RSs) on the second radio frequency band and compare one or more measurements of the one or more RSs on the second radio frequency band to the channel parameter threshold for the second radio frequency band and tracks the number of measurement instances that the measurements of the one or more RSs on the second radio frequency band are below the channel parameter threshold for second radio frequency band.

At 835, the UE initiates a beam failure recovery procedure for a second radio frequency band based, at least in part, on the one or more RSs received on the first radio frequency band.

Figure 9:
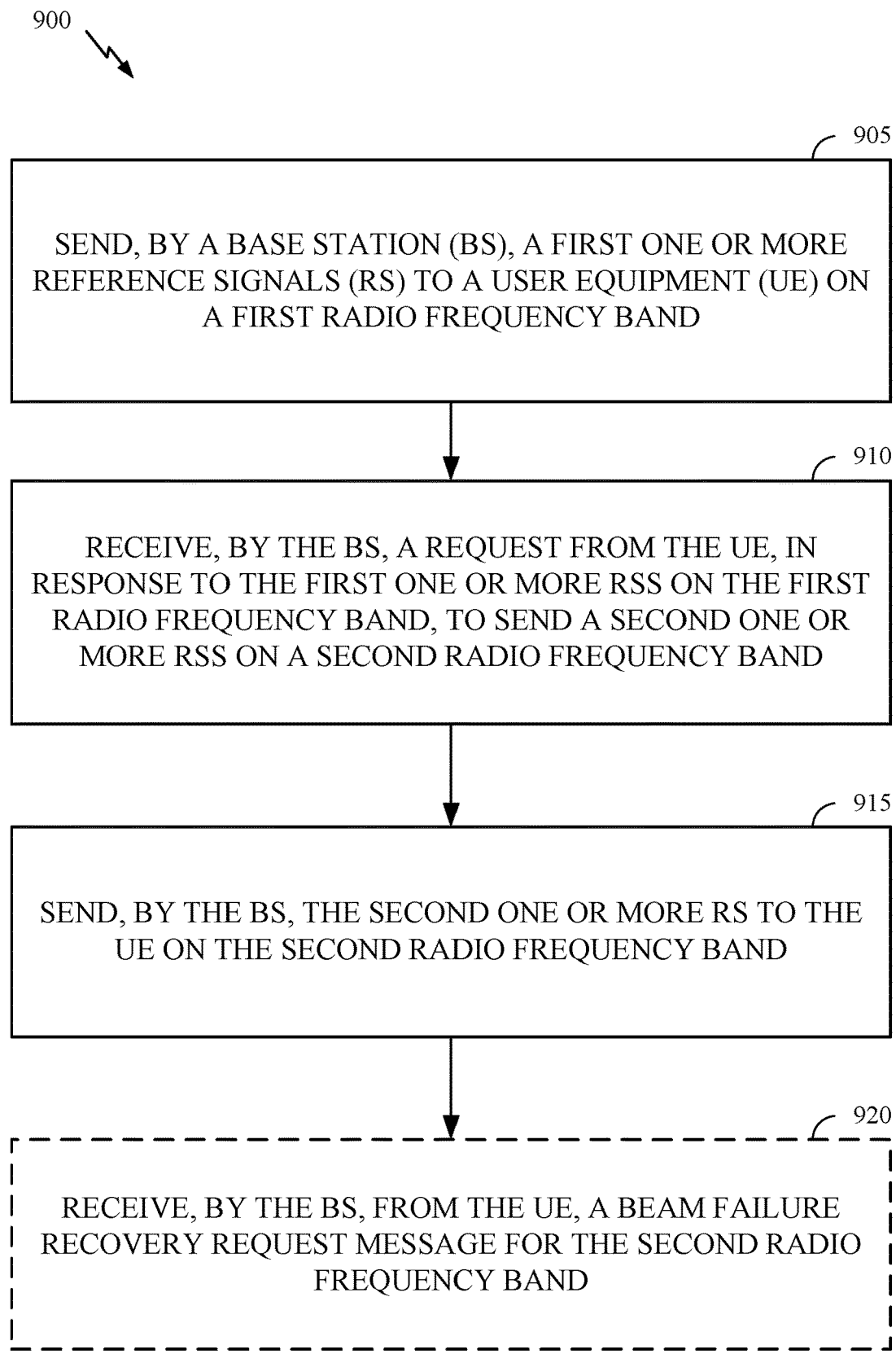
FIG. 9 is a flow diagram illustrating example operations for wireless communication by a BS, in accordance with certain aspects of the present disclosure.

FIG. 9 is a flow diagram illustrating example operations 900 for wireless communication, in accordance with certain aspects of the present disclosure. The operations 900 may be performed, for example, by a BS (e.g., such as the BS 110a in the wireless communication network 100). The operations 900 may be complimentary operations by the BS to the operations 900 performed by the UE. Operations 900 may be implemented as software components that are executed and run on one or more processors (e.g., controller/processor 240 of FIG. 2). Further, the transmission and reception of signals by the BS in operations 900 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 900 may begin, at 905, by sending a first one or more RSs to a UE on a first radio frequency band.

At 910, the BS receives a request from the UE, in response to the first one or more RSs on the first radio frequency band, to send a second one or more RSs on a second radio frequency band.

At 915, the BS sends the second one or more RSs to the UE on the second radio frequency band.

In some examples, at 920, the BS receives, from the UE, a beam failure recovery request message for the second radio frequency band. For example, the beam failure recovery request message may be based, at least in part, on the second one or more RSs sent on the second radio frequency band.

In some examples, the first radio frequency band is in a sub-6 GHz frequency range and the second radio frequency band is in a mmWave frequency range.

Figure 10A:
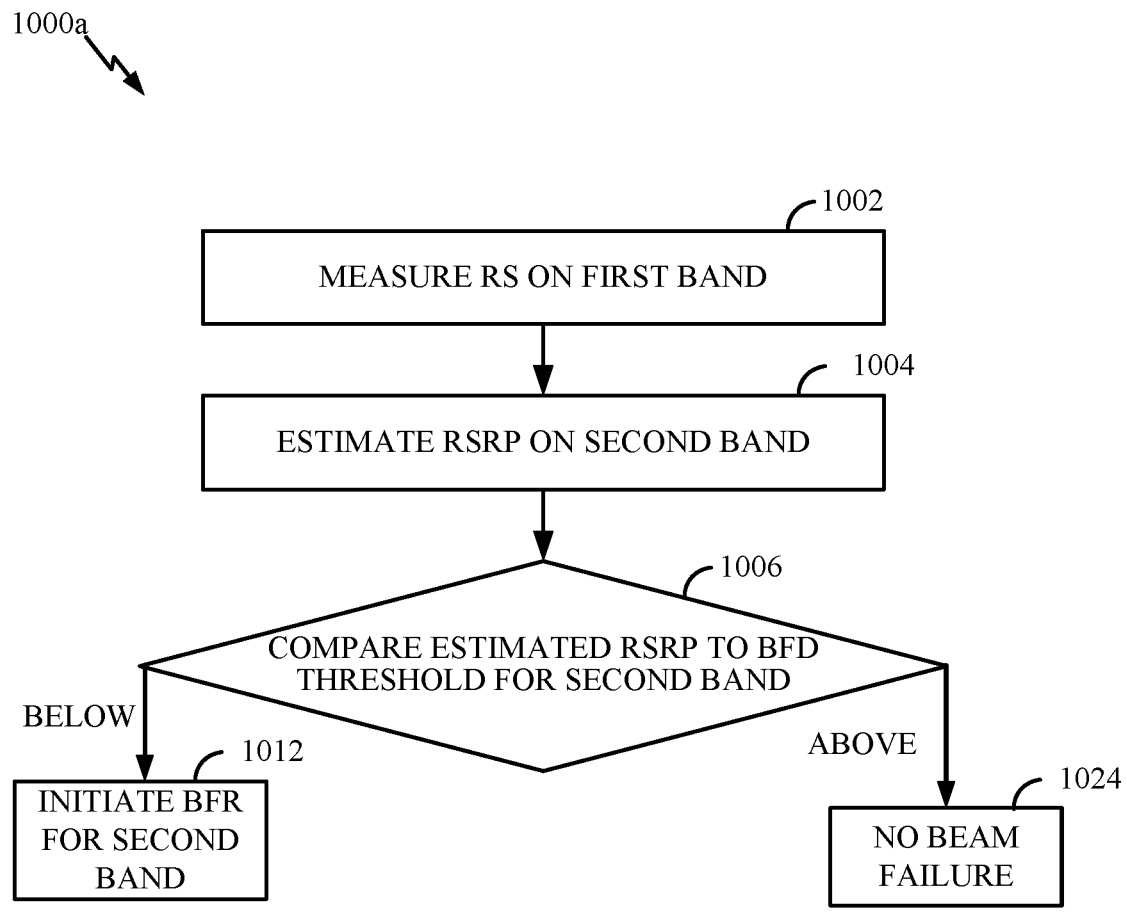
FIG. 10A is a decision tree diagram illustrating example operations for wireless communication by a UE, in accordance with certain aspects of the present disclosure.

FIG. 10A is a decision tree diagram illustrating example operations 1000a for wireless communication by a UE, in accordance with certain aspects of the present disclosure. As shown in FIG. 10, the UE measures one or more RSs on the first band at 1002. At 1004, the UE estimates the RSRP of the serving beam on the second band based on the measurements in the first band (e.g., the measurements performed at 1002). At 1006, the UE compares the estimated RSRP for the second band to the BFD threshold for the second band. If the estimated RSRP for the second band is at or above the BFD threshold for the second band, then, at 1022, the UE may determine that there is not beam failure (and may return to block 1002 to measure RS on the first band). If the estimated RSRP for the second band is below the BFD threshold for the second band, then the UE may initiate BFR for the second band at 1012. For example, the UE may count the measurement instances that the estimated RSRP for the second band is below the BFD threshold for the second band. When the number of measurement instances that the estimated RSRP for the second band is below the BFD threshold for the second band is less than a threshold number of measurements instances, the UE may return to block 1002 to measure RSs on the first band. When the number of measurement instances that the estimated RSRP for the second band is at or above the BFD threshold for the second band is at or above the threshold number of measurements instances, the UE initiates the BFR at 1012.

Figure 10B:
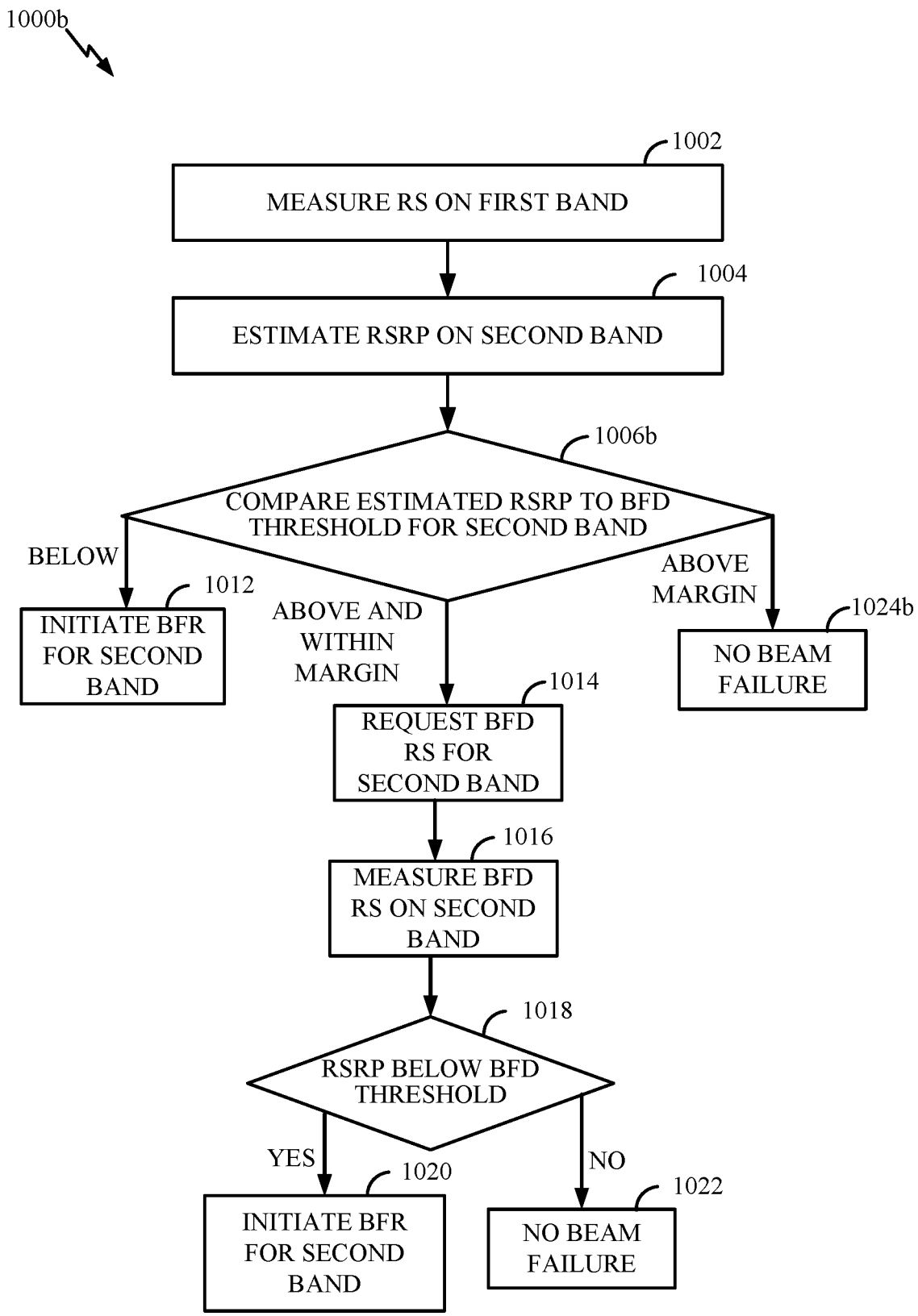
FIG. 10B is another decision tree diagram illustrating example operations for wireless communication by a UE, in accordance with certain aspects of the present disclosure.

FIG. 10B is another decision tree diagram illustrating example operations 1000b for wireless communication by a UE, in accordance with certain aspects of the present disclosure. As shown in FIG. 10B, the UE may further check whether the estimated RSRP is within a margin of the BFD threshold for the second band, at 1006. If the UE determines, at 1006b, that the estimated RSRP for the second band is above the BFD threshold and above the margin of the BFD threshold for the second band, then the UE may determine there is not beam failure at 1024b (e.g., and may return to the block 1002 to measure RS on the first band). On the other hand, if the UE determines at 1006b that, the estimated RSRP is above the BFD threshold and within the margin of the BFD threshold for the second band, the UE may request one or more BFD RSs (e.g., the on-demand BFD RS) for the second band at 1014. At 1016, the UE measures the one or more BFD RSs on the second band. The UE can determine the actual RSRP of the second band based on the measurements of the BFD RSs on the second band. At 1018, the UE determines whether the actual measured RSRP for the second band is below the BFD threshold for the second band. If no, the UE determines there is not beam failure for the second band (e.g., for the serving cell for the second band) at 1022. If yes, the UE may initiate beam failure recovery for the second band at 1020. For example, the UE may count the measurement instances that the actual measured RSRP for the second band is below the BFD threshold for the second band. When the number of measurement instances that the actual measured RSRP for the second band is below the BFD threshold for the second band is less than a threshold number of measurements instances, the UE may return to block 1016 to measure RSs on the second band. When the number of measurement instances that the actual measured RSRP for the second band is at or above the BFD threshold for the second band is at or above the threshold number of measurements instances, the UE initiates the BFR at 1020.

Figure 11A:
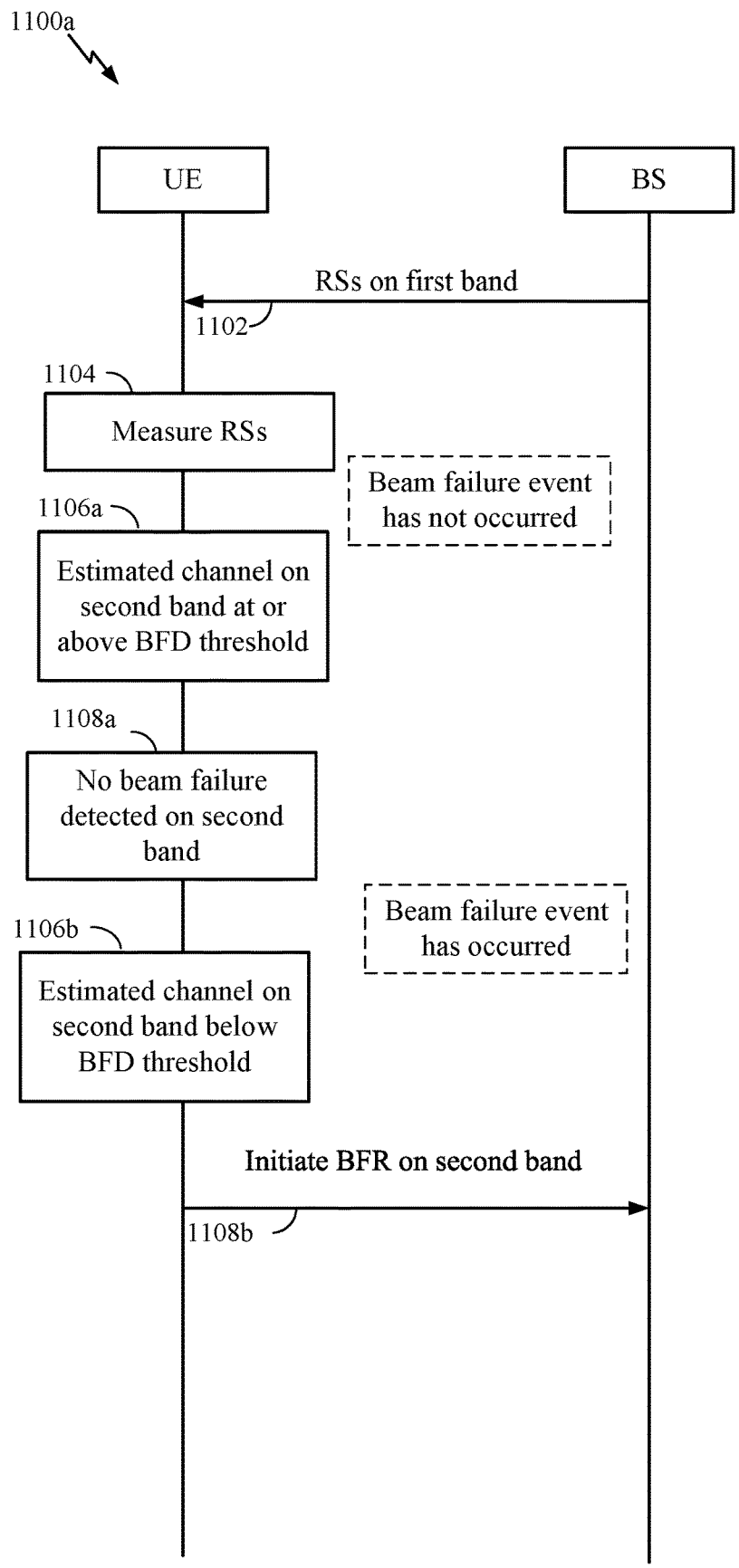
FIG. 11A is a call flow diagram illustrating example signaling, in accordance with certain aspects of the present disclosure.

FIG. 11A is a call flow illustrating example signaling 1100a, in accordance with certain aspects of the present disclosure. At 1102, the BS sends one or more RSs to the UE on the first band. At 1104, the UE measures the one or more RSs on the first band. In some examples, a beam failure event has not occurred. In this case, at 1106a, the UE estimates one or more channel characteristics on the second band and the estimated channel characteristics are at or above the BFD threshold and, at 1108a, the UE may determine no beam failure on the second band. In some examples, a beam failure event has occurred. In this case, at 1106b, the UE estimates one or more channel characteristics on the second band and the estimated channel characteristics are below the BFD threshold and, at 1108b, the UE may initiate beam failure recovery on the second band when the number of measurement instances that the estimated channel characteristics are below the BFD threshold is at or above a threshold number of measurement instances.

Figure 11B:
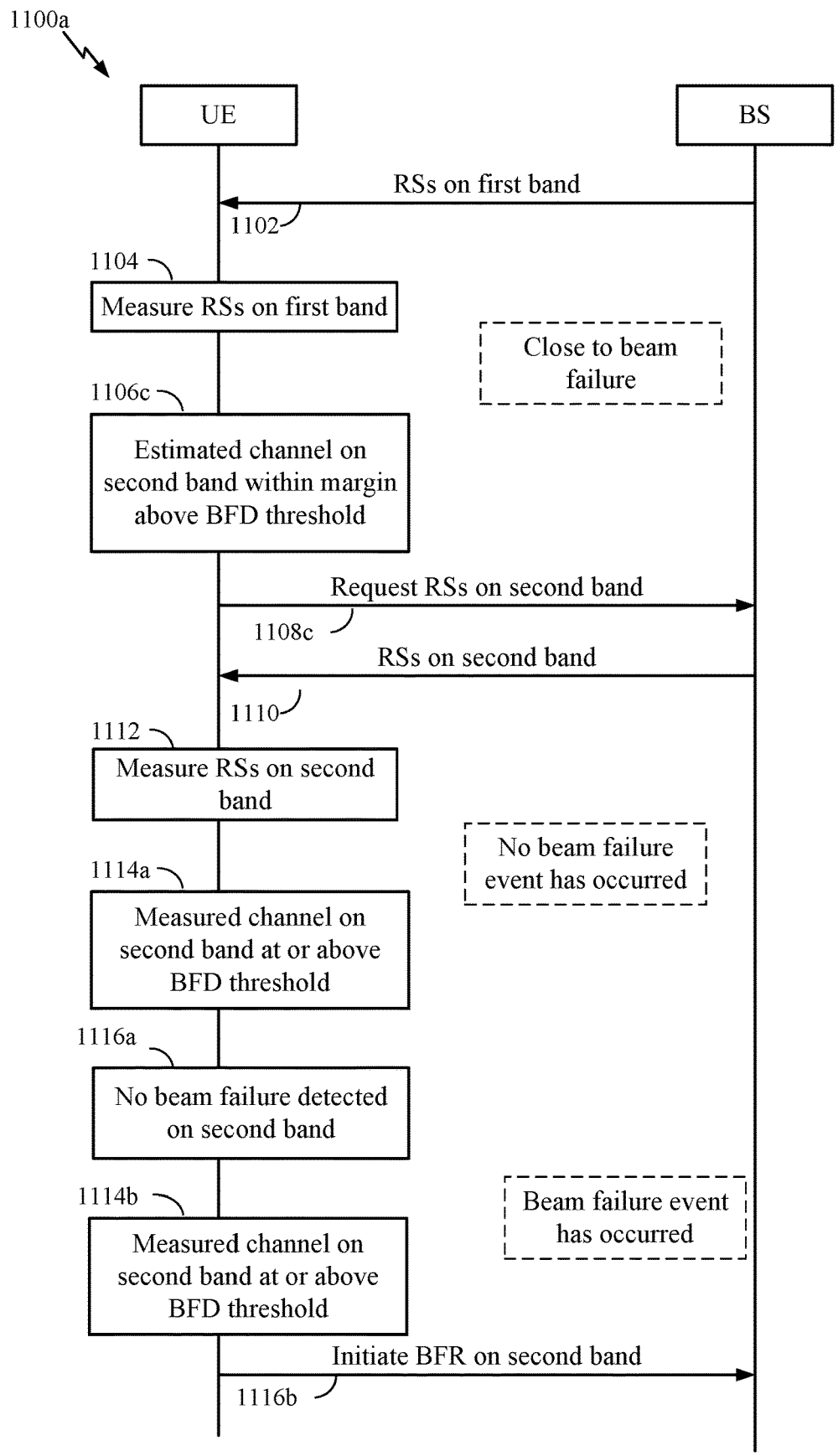
FIG. 11B is a call flow diagram illustrating example signaling, in accordance with certain aspects of the present disclosure.

FIG. 11B is a call flow illustrating example signaling 1100b, in accordance with certain aspects of the present disclosure. At 1102, the BS sends one or more RSs to the UE on the first band. At 1104, the UE measures the one or more RSs on the first band. In some examples, a beam may be close to failure. At 1106c, the UE estimates one or more channel characteristics on the second band and the estimated channel characteristics are within the BFD threshold. At 1108c, the UE requests one or more RSs on the second band. At 1110, the BS sends the requested one or more RSs to the UE on the second band. At 1112, the UE measures the one or more RSs on the second band. In some examples, a beam failure event has not occurred. At 1114a, the measured channel characteristics are at or above the BFD threshold and, at 1116a, the UE may determine no beam failure on the second band. In some examples, a beam failure event has occurred. At 1114b, the measured channel characteristics are below the BFD threshold and, at 1116b, the UE may initiate beam failure recovery on the second band when the number of measurement instances that the estimated channel characteristics are below the BFD threshold is at or above a threshold number of measurement instances.

Figure 12:
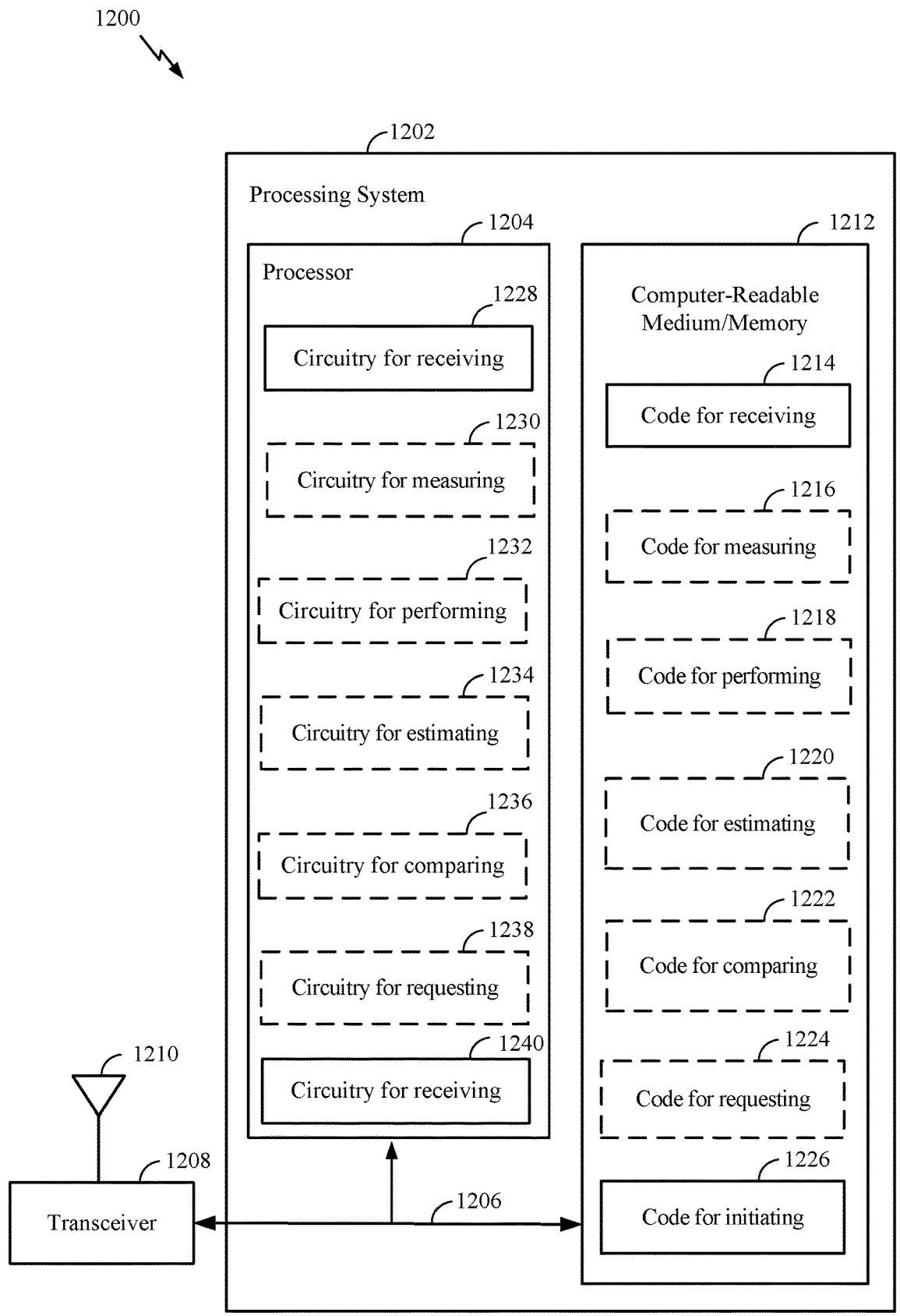
FIG. 12 illustrates a communications device that may include various components configured to perform operations for the techniques disclosed herein, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 1 and/or FIG. 8. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7 and/or FIG. 8, or other operations for performing the various techniques discussed herein for BFD on a second band based on measurements on a first band. In certain aspects, computer-readable medium/memory 1212 stores code 1214 for receiving; code 1216 for measuring; code 1218 for performing; code 1220 for estimating; code 1222 for comparing; code 1224 for requesting; and/or code 1226 for initiating, in accordance with aspects of the disclosure. In certain aspects, the processor 1204 has circuitry configured to implement the code stored in the computer-readable medium/memory 1212. The processor 1204 includes circuitry 1228 for receiving; circuitry 1230 for measuring; circuitry 1232 for performing; circuitry 1234 for estimating; circuitry 1236 for comparing; circuitry 1238 for requesting; and/or circuitry 1240 for initiating, in accordance with aspects of the disclosure, in accordance with aspects of the disclosure.

Figure 13:
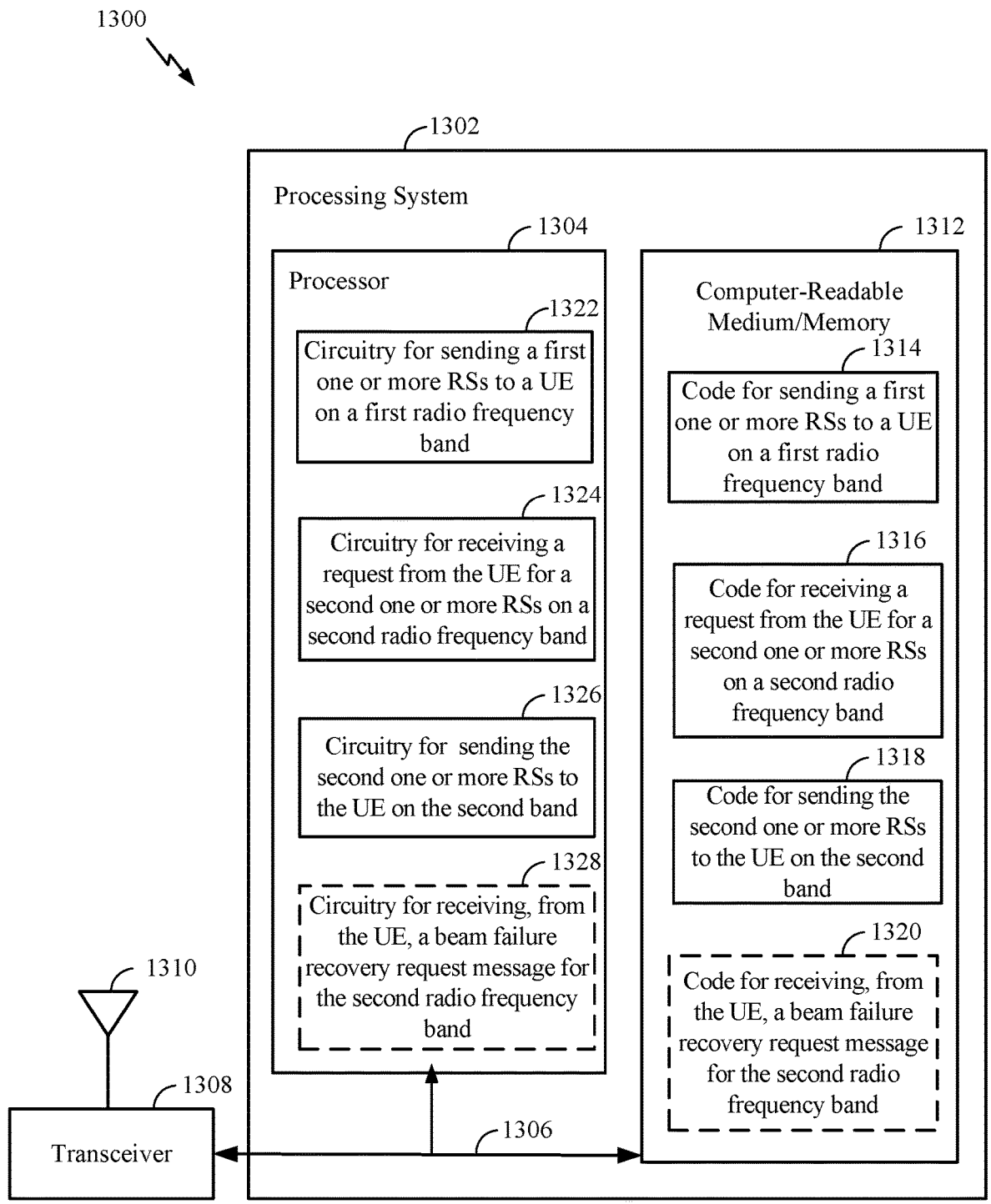
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 9. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 9, or other operations for performing the various techniques discussed herein for BFD on a second band based on measurements on a first band. In certain aspects, computer-readable medium/memory 1312 stores code 1314 for sending a first one or more RSs to a UE on a first radio frequency band; code 1316 for receiving a request from the UE, in response to the first one or more RSs on the first radio frequency band, for a second one or more RSs on a second radio frequency band; code 1318 for sending the second one or more RSs to the UE on the second radio frequency band; and/or code 1320 for receiving, from the UE, a beam failure recovery request message for the second radio frequency band, in accordance with aspects of the disclosure. In certain aspects, the processor 1304 has circuitry configured to implement the code stored in the computer-readable medium/memory 1312. The processor 1304 includes circuitry 1322 for sending a first one or more RSs to a UE on a first radio frequency band; circuitry 1322 for receiving a request from the UE, in response to the first one or more RSs on the first radio frequency band, to send a second one or more RSs on a second radio frequency band; circuitry 1326 for sending the second one or more RSs to the UE on the second radio frequency band; and/or circuitry 1328 for receiving, from the UE, a beam failure recovery request message for the second radio frequency band, in accordance with aspects of the disclosure.

Example Aspects

Implementation examples are described in the following numbered clauses:

Aspect 1. A method for wireless communications by a user equipment (UE), comprising: receiving one or more reference signals (RSs) on a first radio frequency band; and initiating a beam failure recovery procedure for a second radio frequency band based, at least in part, on the one or more RSs received on the first radio frequency band.

Aspect 2. The method of aspect 1, further comprising: measuring the one or more RSs on the first radio frequency band; and performing beam failure detection (BFD) for the second radio frequency band based, at least in part, on one or more measurements of the one or more RSs on the first radio frequency band.

Aspect 3. The method of aspect 2, wherein performing BFD for the second radio frequency band comprises: estimating one or more channel parameters of the second radio frequency band using a machine learning (ML) algorithm with the one or more measurements of the one or more RSs on the first radio frequency band as input; and comparing the estimated one or more channel parameters of the second radio frequency band to a BFD threshold for the second radio frequency band.

Aspect 4. The method of aspect 3, wherein performing BFD for the second radio frequency band comprises: detecting beam failure for the second radio frequency band when the estimated one or more channel parameters of the second radio frequency band are below the BFD threshold for the second radio frequency band for at or above a threshold number of measurement instances.

Aspect 5. The method of any of aspects 3-4, wherein performing BFD for the second radio frequency band comprises: requesting one or more RSs on the second radio frequency band when the estimated one or more channel parameters of the second radio frequency band are within a predefined margin of the BFD threshold for the second radio frequency band; measuring the one or more RSs on the second radio frequency band; and comparing one or more measurements of the one or more RSs on the second radio frequency band to the BFD threshold for the second radio frequency band.

Aspect 6. The method of claim 5, wherein requesting the one or more RSs on the second radio frequency band comprises requesting a base station (BS) to transmit one or more on-demand beam failure detection (BFD) RSs on the second radio frequency band.

Aspect 7. The method of any of aspects 2-6, wherein the one or more measurements on the first radio frequency band comprises one or more reference signal receive power (RSRP) measurements, one or more positioning measurements, one or more raw channel measurements, one or more channel impulse response (CIR) measurements, one or more angle of departure (AoD) measurements, one or more delay measurements, or a combination thereof.

Aspect 8. The method of any of aspects 2-7, wherein the estimated one or more channel parameters comprises estimated one or more reference signal receive power (RSRP) values.

Aspect 9. The method of any of aspects 1-8, wherein the first radio frequency band is in a sub-6 GHz radio frequency range and the second radio frequency band is in a millimeter wave (mmW) radio frequency range.

Aspect 10. A method for wireless communications by a base station (BS), comprising: sending a first one or more reference signals (RSs) to a user equipment (UE) on a first radio frequency band; receiving a request from the UE, in response to the first one or more RSs on the first radio frequency band, to send a second one or more RSs on a second radio frequency band; and sending the second one or more RSs to the UE on the second radio frequency band.

Aspect 11. The method of aspect 10, further comprising: receiving, from the UE, a beam failure recovery request message for the second radio frequency band.

Aspect 12. The method of any of aspects 10-11, wherein the first radio frequency band is in a sub-6 GHz radio frequency range and the second radio frequency band is in a millimeter wave (mmW) radio frequency range.

Aspect 13. The method of any of aspects 10-12, wherein receiving the request from the UE to send the second one or more RSs on the second radio frequency band comprises receiving the request on a physical uplink control channel (PUCCH).

Aspect 14. The method of any of aspects 10-13, wherein receiving the request from the UE to send the second one or more RSs on the second radio frequency band comprises receiving a request, from the UE, to transmit one or more on-demand beam failure detection (BFD) RSs on the second radio frequency band.

Aspect 15. An apparatus comprising means for performing the method of any of aspects 1 through 14.

Aspect 16. An apparatus comprising at least one processor and a memory coupled to the at least one processor, the memory comprising code executable by the at least one processor to cause the apparatus to perform the method of any of aspects 1 through 14.

Aspect 17. A computer readable medium storing computer executable code thereon for wireless communications that, when executed by at least one processor, cause an apparatus to perform the method of any of aspects 1 through 14.

Additional Consideration

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
    receiving a first one or more reference signals (RSs) on a first radio frequency band;
    sending a request, in response to the first one or more RSs on the first radio frequency band, for a second one or more RSs on a second radio frequency band; and
    initiating a beam failure recovery procedure for a second radio frequency band based, at least in part, on the second one or more RSs received on the second radio frequency band.

2. The method of claim 1, further comprising:
    measuring the first one or more RSs on the first radio frequency band; and
    performing beam failure detection (BFD) for the second radio frequency band based, at least in part, on one or more measurements of the first one or more RSs on the first radio frequency band.

3. The method of claim 2, wherein performing BFD for the second radio frequency band comprises:
    estimating one or more channel parameters of the second radio frequency band using a machine learning (ML) algorithm with the one or more measurements of the first one or more RSs on the first radio frequency band as input; and
    comparing the estimated one or more channel parameters of the second radio frequency band to a BFD threshold for the second radio frequency band.

4. The method of claim 3, wherein performing BFD for the second radio frequency band comprises:
    detecting beam failure for the second radio frequency band when the estimated one or more channel parameters of the second radio frequency band are below the BFD threshold for the second radio frequency band for at or above a threshold number of measurement instances.

5. The method of claim 3, wherein:
    the requesting the second one or more RSs on the second radio frequency band comprises requesting the second one or more RSs on the second radio frequency band when the estimated one or more channel parameters of the second radio frequency band are within a predefined margin of the BFD threshold for the second radio frequency band; and
    the performing the BFD for the second radio frequency band comprises:
        measuring the second one or more RSs on the second radio frequency band; and
        comparing one or more measurements of the second one or more RSs on the second radio frequency band to the BFD threshold for the second radio frequency band.

6. The method of claim 5, wherein the requesting the second one or more RSs on the second radio frequency band comprises requesting a base station (BS) to transmit one or more on-demand beam BFD RSs on the second radio frequency band.

7. The method of claim 3, wherein the estimated one or more channel parameters comprises estimated one or more reference signal receive power (RSRP) values.

8. The method of claim 2, wherein the one or more measurements on the first radio frequency band comprises one or more reference signal receive power (RSRP) measurements, one or more positioning measurements, one or more raw channel measurements, one or more channel impulse response (CIR) measurements, one or more angle of departure (AoD) measurements, one or more delay measurements, or a combination thereof.

9. The method of claim 1, wherein the first radio frequency band is in a sub-6 GHz radio frequency range and the second radio frequency band is in a millimeter wave (mmW) radio frequency range.

10. A method for wireless communications by a base station (BS), comprising:
    outputting a first one or more reference signals (RSs) to a user equipment (UE) on a first radio frequency band;
    obtaining a request from the UE, in response to the first one or more RSs on the first radio frequency band, to send a second one or more RSs on a second radio frequency band;
    outputting the second one or more RSs to the UE on the second radio frequency band; and
    obtaining a beam failure recovery request message from the UE in response to the second one or more RSs.

11. The method of claim 10, wherein the first radio frequency band is in a sub-6 GHz radio frequency range and the second radio frequency band is in a millimeter wave (mmW) radio frequency range.

12. The method of claim 10, wherein receiving the request from the UE to send the second one or more RSs on the second radio frequency band comprises receiving the request on a physical uplink control channel (PUCCH).

13. The method of claim 10, wherein receiving the request from the UE to send the second one or more RSs on the second radio frequency band comprises receiving a request, from the UE, to transmit one or more on-demand beam failure detection (BFD) RSs on the second radio frequency band.

14. An apparatus for wireless communications, comprising:
    a memory; and
    at least one processor coupled with the memory, the memory and processor configured to:
        receive a first one or more reference signals (RSs) on a first radio frequency band;
        send a request, in response to the first one or more RSs on the first radio frequency band, for a second one or more RSs on a second radio frequency band; and initiate a beam failure recovery procedure for a second radio frequency band based, at least in part, on the one or more RSs received on the second radio frequency band.

15. The apparatus of claim 14, wherein the memory and processor are further configured to:
measure the one or more RSs on the first radio frequency band; and
perform beam failure detection (BFD) for the second radio frequency band based, at least in part, on one or more measurements of the first one or more RSs on the first radio frequency band.

16. The apparatus of claim 15, wherein the memory and processor are further configured to:
estimate one or more channel parameters of the second radio frequency band using a machine learning (ML) algorithm with the one or more measurements of the first one or more RSs on the first radio frequency band as input; and
compare the estimated one or more channel parameters of the second radio frequency band to a BFD threshold for the second radio frequency band.

17. The apparatus of claim 16, wherein the memory and processor are configured to:
detect beam failure for the second radio frequency band when the estimated one or more channel parameters of the second radio frequency band are below the BFD threshold for the second radio frequency band for at or above a threshold number of measurement instances.

18. The apparatus of claim 16, wherein the memory and processor are configured to:
request the second one or more RSs on the second radio frequency band when the estimated one or more channel parameters of the second radio frequency band are within a predefined margin of the BFD threshold for the second radio frequency band;
measure the second one or more RSs on the second radio frequency band; and
compare one or more measurements of the second one or more RSs on the second radio frequency band to the BFD threshold for the second radio frequency band.

19. The apparatus of claim 18, wherein the memory and processor are configured to request a base station (BS) to transmit one or more on-demand BFD RSs on the second radio frequency band.

20. The apparatus of claim 16, wherein the estimated one or more channel parameters comprises estimated one or more reference signal receive power (RSRP) values.

21. The apparatus of claim 15, wherein the one or more measurements on the first radio frequency band comprises one or more reference signal receive power (RSRP) measurements, one or more positioning measurements, one or more raw channel measurements, one or more channel impulse response (CIR) measurements, one or more angle of departure (AoD) measurements, one or more delay measurements, or a combination thereof.

22. The apparatus of claim 14, wherein the first radio frequency band is in a sub-6 GHz radio frequency range and the second radio frequency band is in a millimeter wave (mmW) radio frequency range.

23. An apparatus for wireless communications, comprising:
a memory; and
at least one processor coupled with the memory, the memory and processor configured to:
output a first one or more reference signals (RSs) to a user equipment (UE) on a first radio frequency band;
obtain a request from the UE, in response to the first one or more RSs on the first radio frequency band, to send a second one or more RSs on a second radio frequency band;
output the second one or more RSs to the UE on the second radio frequency band; and
obtain a beam failure recovery request message from the UE in response to the second one or more RSs.

24. The apparatus of claim 23, wherein the first radio frequency band is in a sub-6 GHz radio frequency range and the second radio frequency band is in a millimeter wave (mmW) radio frequency range.

25. The apparatus of claim 23, wherein the memory and processor are configured to receive the request on a physical uplink control channel (PUCCH).

26. The apparatus of claim 23, wherein the memory and processor are configured to receive a request, from the UE, to transmit one or more on-demand beam failure detection (BFD) RSs on the second radio frequency band.

* * * * *